Dec. 12, 1950         L. G. EGGER         2,534,113
METHOD OF MAKING NONWOVEN MATERIAL

Filed May 28, 1947                                       2 Sheets-Sheet 1

INVENTOR.
Luis G. Egger.
BY John P. DeGarmo
ATTORNEY.

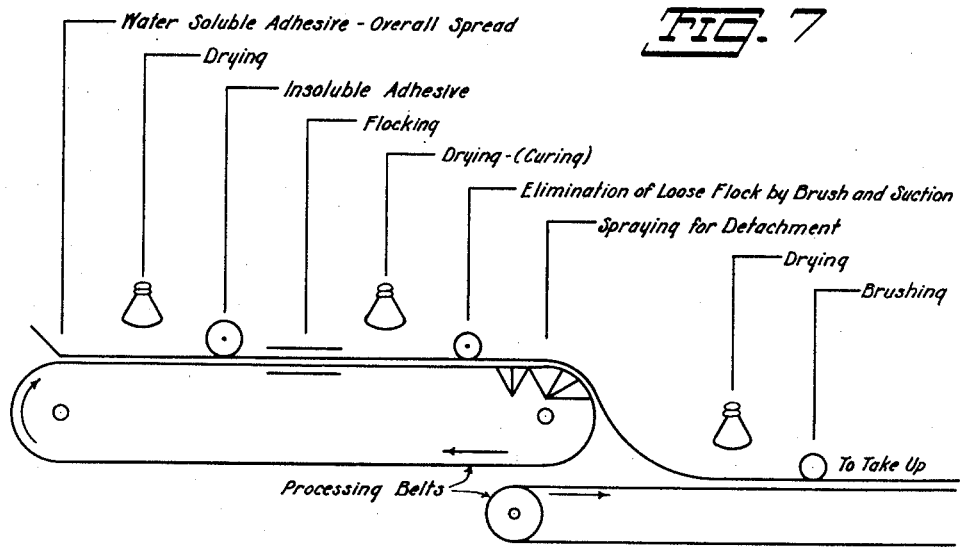
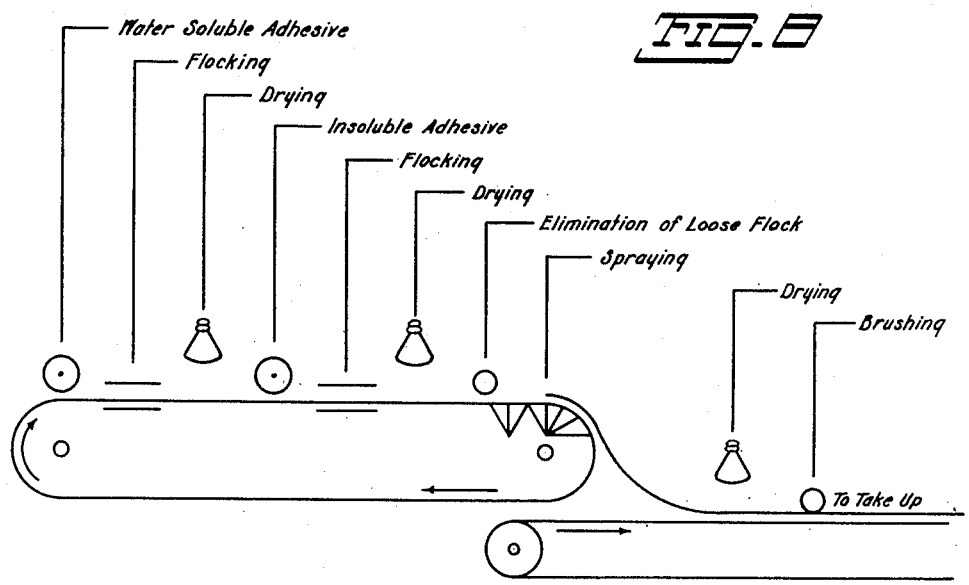

Patented Dec. 12, 1950

2,534,113

UNITED STATES PATENT OFFICE 2,534,113

METHOD OF MAKING NONWOVEN MATERIAL

Luis G. Egger, New York, N. Y., assignor to United Merchants & Manufacturers Inc., Wilmington, Del., a corporation of Delaware Application May 28, 1947, Serial No. 751,011

16 Claims. (Cl. 154—98)

This invention relates to textiles and in particular to that class of textiles known as non-woven or loomless materials.

One object of the present invention is the production of a material having the appearance and hand of a woven fabric which does not require any loom or other weaving apparatus in its manufacture. Furthermore the product contemplated may be made in decorative patterns according to the method disclosed herein, at a cost considerably below that of woven materials or fabrics.

Figure 1:
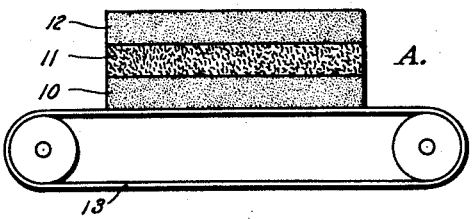
Figure 2:

With the above and other objects in view, as will be apparent, the present invention consists in the construction, combination and arrangements of parts, all as hereinafter more fully described, claimed and illustrated in the accompanying drawings wherein:

Figs. 1 and 2 refer to one method of carrying out the present invention.

Figure 3:
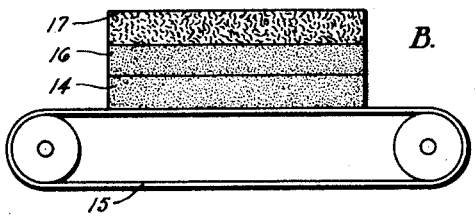
Figure 4:

Figs. 3 and 4 refer to another method.

Figure 5:
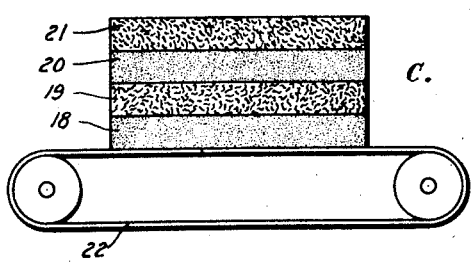
Figure 6:
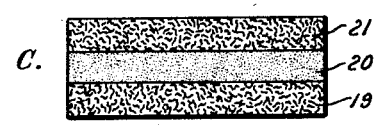

Figs. 5 and 6 refer to a third embodiment of the invention; and

Figs. 7 and 8 diagrammatically illustrate apparatus suitable for use in practicing the instant invention.

As heretofore indicated the invention contemplates a non-woven or loomless material having the feel, handle and appearance of woven materials and a method of making the same. To that end it is proposed to deposit a layer of soluble adhesive upon any convenient and suitable surface. The purpose of such deposit is to establish a base, ground or carrier for removably supporting other layers or coatings of materials to be added, as will be described. A layer of discrete fibers or other suitable non-woven material is then deposited on and over the layer of soluble adhesive. In this operation or manner, the layer of fibers or other non-woven material becomes temporarily fixed in and united to the layer of soluble adhesive. A third layer which may be made of any suitable insoluble adhesive is then brought into contact and union with the layer of non-woven material. Thus there is formed a unitary composite non-woven material comprising a layer of fibers or other material laminated between layers of soluble adhesive and insoluble adhesive. The composite material is then treated to remove the soluble adhesive, thus leaving a non-woven material of components adhesively and permanently united, for any desired use. The non-woven or loomless material resulting from the present invention may be either in the form of a simple web or unperforated sheet of material, in the form of material printed with a design, or in the form of goods containing perforations decoratively arranged or openwork figured material, as for example in a lace-like pattern, suitable for use as doilies, draperies, curtains, napkins, etc. It has been found that articles may be produced by the present invention which simulate or resemble woven lace in appearance, hand and feel. They are, however, produced or manufactured more quickly and at much lower cost, since the conventional weaving operations are entirely eliminated.

In Figs. 1 and 2 of the drawings, one embodiment of the present invention is illustrated. The composite non-woven material A comprises a plurality of successive laminations or layers 10—12 supported on any suitable carrier, base or workpiece 13. The upper face of the workpiece 13 may be of any suitable material and construction, such as for example glass, metal or a fine wire mesh sheet or screen. The layer 10 may comprise a coating of polyvinyl alcohol which is an adhesive soluble in water, applied in liquid form to the upper surface of carrier or workpiece 13. Before allowing the sheet 10 of polyvinyl alcohol to solidify or harden, a coating or deposit 11 of discrete fibers of any length or other non-woven fibrous material, as for example, what is known as flock is applied on top of the sheet 10 thereby establishing a deposit of flock 11 adhesively but temporarily united to the sheet of polyvinyl alcohol 10 supported on base 13. A top layer or coating 12 is then added to the surface of the flock deposit 11. This top layer 12 may constitute a coating of a copolymer of vinyl chloride and vinyl acetate, such as for example, "Vinylite," the purpose being to add a coating 12 of an adhesive material insoluble in water as opposed to the coating 10 that is soluble in water, on the other side of the layer of flock material 11. As will be apparent, the layers 10—12 constitute a unitary composite non-woven material A, comprising a layer of flock 11 intermediate the water soluble adhesive 10 and the water insoluble adhesive 12; the layers 10—12 resting on or supported by base 13.

The layers 10—12 of material are then allowed to harden and dry, after which as indicated in Fig. 2, the temporary adhesive 10 is dissolved by immersing in warm water, thereby floating free of the base 13 the layer of flock 11 permanently and adhesively associated with the water insoluble "Vinylite" 12. After rinsing and drying again, the web of flock A, the fibers of which are adhesively and permanently united by means of the "Vinylite" 12, is ready for use as desired.

Figs. 3 and 4 illustrate another embodiment of the present invention. In this case, the arrangement of deposits or layers varies from that shown in Figs. 1 and 2 and described above. Here the first coating is the soluble adhesive 14, which is deposited on base plate or carrier 15. The soluble adhesive 14 of material B is applied in the same fashion as adhesive 10 of material A. Layers 16 and 17 are applied in like manner, but in this embodiment the order of application is reversed, in that the insoluble adhesive coating 16 is applied to the soluble adhesive coating 14. This is followed by an uppermost deposit 17 of flock or other non-woven material. Thus at this stage material B constitutes a unitary composite non-woven material composed of successive layers of water soluble adhesive 14, water insoluble adhesive 16 and flock 17—the layers 14, 16 and 17 all being removably supported on base or carrier 15. For the purpose of disengaging the composite material B from support 15, the layers 14, 16 and 17 may be immersed in or sprayed by warm water, whereupon the water soluble adhesive 14 is dissolved, and the layer or sheet 17 of flock fibers adhesively and permanently united by layer 16 of water insoluble adhesive floats free of the support 15. After rinsing and drying material B is ready for use as desired.

It is to be noted that in practicing the invention illustrated in Figs. 1 and 2, as described, one result in the finished material A may be that its undersurface, or that portion of the layer of flock 11 lately in contact with layer 10 is rather shiny and flat. These characteristics may be considered quite desirable in some cases. In others they may be thought to be objectionable. By reversing the order of application of the several layers to the support however, as shown in Figs. 3 and 4 and described in respect of material B, such characteristics can be alleviated or avoided.

In Figs. 5 and 6 is shown a third embodiment of the present invention wherein a plurality of separate and distinct layers of flock, textile fibers or other suitable non-woven fibrous material of any predetermined length are employed. By practicing this method, tendencies toward a flat and shiny undersurface may be further alleviated or eliminated. In this embodiment is shown material C, which likewise is a unitary composite non-woven material, comprising the layers 18—21 supported on base or workpiece 22. These layers 18—21 may be applied in the same manner as layers 10—12 of material A and layers 14, 16 and 17 of material B. As shown however, the non-woven material C includes a plurality of flock applications 19 and 21 with an intermediate filler or binder 20 of water insoluble adhesive and an outer or undercoating 18 of water soluble adhesive adjacent to and in temporary contact with the layer 19 of flock fibers. Here again, as indicated in Fig. 6, the unitary non-woven composite material C may be removed from or floated free of the workpiece 22 by dissolving the temporary and soluble adhesive 18 with water. After rinsing and drying the non-woven material C is then ready for use or storage.

Suitable apparatus for carrying out the present invention and a sequence of steps for the same is schematically illustrated in Figs. 7 and 8 of the drawings hereof. Fig. 7 indicates diagrammatically apparatus suitable for practicing either of the two embodiments shown in Figs. 1, 2 and Figs. 3 and 4, described above.

For the embodiment of Figs. 3 and 4, a water soluble adhesive is applied to the top surface of a traveling endless belt of any suitable material, such as, for example, a flexible wire mesh screen or perforated leather belt. As previously indicated, the adhesive may be in the form of an overall spread or coating or it may be applied as a paste and printed in the form of lace or other design as desired. After drying, as by means of infra-red lamps for example the insoluble adhesive is applied, followed by flocking. This sequence of application is in accordance with the embodiments of Figs. 3 and 4. For the embodiment of Figs. 1 and 2, the order is varied as previously explained, and the application of flock fibers or other non-woven material precedes the application of the insoluble adhesive. In this case however the soluble adhesive is not allowed to dry before the fibers are deposited thereon. In both embodiments, after both the soluble and insoluble adhesives and the flock have been applied, the composite non-woven material may be dried and cured. The composite loomless material may then be brushed and/or subjected to a suction to eliminate loose end fibers or other waste material. The next operation or step calls for separation of the composite material from the processing belt. This may be effected by spraying water through the underside of the belt as indicated in Figs. 7 and 8. After detachment from the processing belt or support, the material is then dried once more, taken up and stored for future use.

Fig. 8 illustrates diagrammatically apparatus similar to that of Fig. 7, and adapted for use with the method of Figs. 5 and 6. Here the flock, textile fibers or other non-woven material may be applied on both sides of an insoluble binder or adhesive, as previously set forth. The sequence of operations is as follows: A water soluble adhesive is first applied to the processing belt, either as an overall spread or in any desired design. This is followed by flocking and drying, a deposit of insoluble adhesive over the flock, a second application of flock over the insoluble adhesive, drying and curing of the composite material, elimination of loose fibers or flock as by brushing or suction, spraying to dissolve the soluble adhesive and detach the composite material from the processing belt, drying and brushing again, and take up as by transfer of the material to another processing belt.

The foregoing sets forth several methods or embodiments of the present invention whereby to produce non-woven material either with or without a decorative design or pattern therein. The material may be figured openwork as in laces, or not, as desired. Fibers other than flock fibers, and any suitable non-woven materials may be employed. Natural or synthetic materials or combinations of both may be used in carrying out the invention. Furthermore the apparatus schematically illustrated in Figs. 7 and 8 (for which no claim is made) is not intended as any limitation of the instant invention. On the contrary it is included for the purpose of indicating equipment conveniently adapted for practicing the embodiments herein disclosed.

What is claimed is:

1. Method of making non-woven fibrous material, comprising the steps of applying an aqueous film of a water-soluble adhesive to a temporary support, distributing a layer of discrete fibers thereover while said film is still in an adhesive condition, removing the water from said film to cause said fibers to be fixed in web form, applying a coating of a water-insoluble resinous film forming organic material over the surface of said fibers whereby the fibers are partially embedded in the resinous film, drying said resinous film, and releasing the water-insoluble resinous film and partially embedded fibers from the temporary support by dissolving the water-soluble adhesive.

2. The method of claim 1, wherein the water-soluble adhesive is polyvinyl alcohol.

3. The method of claim 1, wherein the water-insoluble resinous material is a co-polymer of vinyl chloride and vinyl acetate.

4. The method of claim 1, wherein the water-soluble adhesive is polyvinyl alcohol and the water-insoluble resinous material is a copolymer of vinyl chloride and vinyl acetate.

5. Method of making non-woven fibrous material, comprising the steps of applying an aqueous film of a water-soluble adhesive to a temporary support, distributing a layer of discrete fibers thereover while said film is still in an adhesive condition, removing the water from said film to cause said fibers to be fixed in web form, applying a coating of a water-insoluble resinous film forming organic material over the surface of said fibers whereby the fibers are partially embedded in the resinous film, distributing a second layer of discrete fibers over said resinous film whereby the discrete fibers of said second layer are also partially embedded in the resinous film, drying said resinous film, and releasing the water-insoluble resinous film and the discrete fibers of both layers partially embedded therein from the temporary support by dissolving the water-soluble adhesive.

6. The method of claim 5, wherein the water-soluble adhesive is polyvinyl alcohol.

7. The method of claim 5, wherein the water-insoluble resinous material is a copolymer of vinyl chloride and vinyl acetate.

8. The method of claim 5, wherein the water-soluble adhesive is polyvinyl alcohol and the water-insoluble resinous material is a copolymer of vinyl chloride and vinyl acetate.

9. Method of making non-woven fibrous material, comprising the steps of applying an aqueous film of a water-soluble adhesive to a temporary support in a predetermined pattern, distributing a layer of discrete fibers thereover while said film is still in an adhesive condition, removing the water from said film to cause said fibers to be fixed in the form of said predetermined pattern, applying a coating of a water-insoluble resinous film forming organic material over the surface of said fibers whereby the fibers are partially embedded in the resinous film, drying said resinous film, and releasing the water-insoluble resinous film and partially embedded fibers from the temporary support by dissolving the water-soluble adhesive.

10. The method of claim 9, wherein the water-soluble adhesive is polyvinyl alcohol.

11. The method of claim 9, whereby the water-insoluble resinous material is a copolymer of vinyl chloride and vinyl acetate.

12. The method of claim 9, wherein the water-soluble adhesive is polyvinyl alcohol and the water-insoluble resinous material is a copolymer of vinyl chloride and vinyl acetate.

13. Method of making non-woven fibrous material comprising the steps of applying an aqueous film of a water-soluble adhesive to a temporary support in a predetermined pattern, distributing a layer of discrete fibers thereover while said film is still in an adhesive condition, removing the water from said film to cause said fibers to be fixed in the form of said predetermined pattern, applying a coating of a water-insoluble resinous film forming organic material co-extensively with and over the surface of said fibers whereby the fibers are partially embedded in the resinous film, drying said resinous film, and releasing the water-insoluble resinous film and partially embedded fibers from the temporary support by dissolving the water-soluble adhesive.

14. The method of claim 13, wherein the water-soluble adhesive is polyvinyl alcohol.

15. The method of claim 13, wherein the water-insoluble resinous material is a copolymer of vinyl chloride and vinyl acetate.

16. The method of claim 13, wherein the water-soluble adhesive is polyvinyl alcohol and the water-insoluble resinous material is a copolymer of vinyl chloride and vinyl acetate.

LUIS G. EGGER.

REFERENCES CITED

The following references are of record in the file of this patent:

UNITED STATES PATENTS

| Number | Name | Date |
| --- | --- | --- |
| 689,320 | Markus | Dec. 17, 1901 |
| 1,861,003 | Foster | May 31, 1932 |
| 2,222,539 | Meston | Nov. 19, 1940 |
| 2,290,238 | Hickok | July 21, 1942 |
| 2,345,013 | Soday | Mar. 28, 1944 |
| 2,354,049 | Palmquist | July 18, 1944 |
| 2,430,534 | Rodli | Nov. 11, 1947 |